Figure 10:
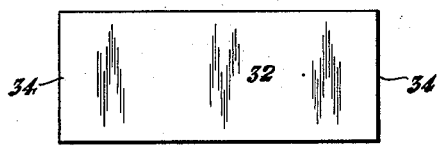

Feb. 25, 1930.   M. L. HUNKER   1,748,772
METHOD OF MAKING TAPERED TUBULAR OBJECTS
Filed Dec. 2, 1927   2 Sheets-Sheet 1
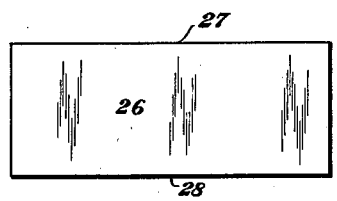
Fig. 4
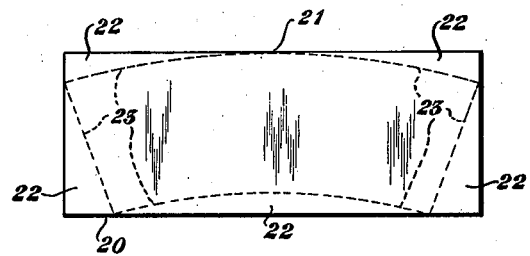
Fig. 1
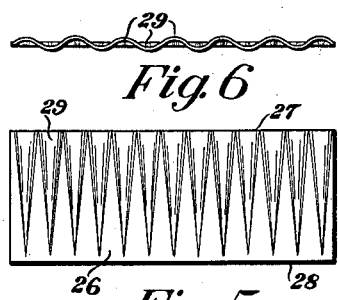
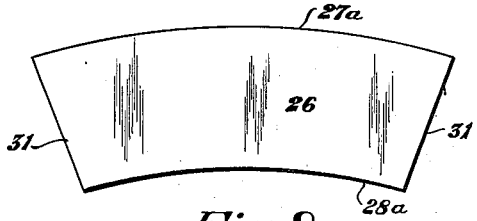
Fig. 5  Fig. 7
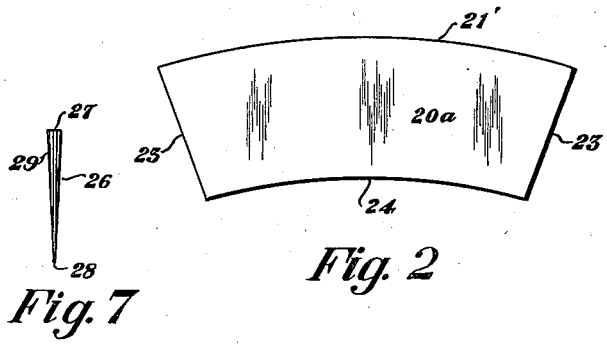
Fig. 2
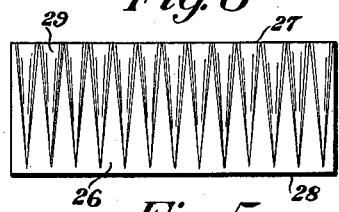
Fig. 8
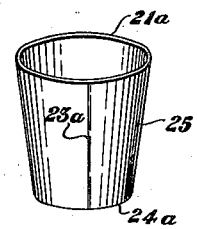
Fig. 3
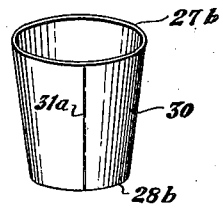
Fig. 9
Inventor
M. L. Hunker
By
Freast and Bond Attorneys Feb. 25, 1930.                M. L. HUNKER                 1,748,772
                METHOD OF MAKING TAPERED TUBULAR OBJECTS
                    Filed Dec. 2, 1927        2 Sheets-Sheet 2

Inventor

M. L. Hunker

By Frease and Bond  Attorneys

Patented Feb. 25, 1930

1,748,772

UNITED STATES PATENT OFFICE

MARTIN L. HUNKER, OF DOVER, OHIO, ASSIGNOR TO THE REEVES MANUFACTURING COMPANY, OF DOVER, OHIO, A CORPORATION OF OHIO

METHOD OF MAKING TAPERED TUBULAR OBJECTS

Application filed December 2, 1927. Serial No. 237,233.

The invention relates to the manufacture of tapered tubular sheet-metal articles and is particularly adapted to the manufacture of sheet-metal buckets, pails, cans, tubs, and the like.

In the manufacture of the tapered tubular bodies for such articles, as now in general use, it is customary to form the tapered body of the pail or other article from a metal sheet of considerably greater area than the article to be formed therefrom.

The ends of this sheet are then sheared at an angle, and the side edges are sheared arcuately, producing a sheet blank having its longer edge substantially equal to the larger circumference of the article and the opposite edge substantially equal to the smaller circumference of the article to be formed.

The sheet blank thus produced is then formed into tapered tubular shape and the meeting edges are connected by a seam or the like of any usual and well-known construction.

It will be seen that this method of forming the article results in a considerable loss of the sheet metal by shearing the ends at an angle and the side edges arcuately as above described.

The object of the present improvement is to produce a tapered tubular article from a rectangular sheet blank of a length substantially equal to the smaller circumference of the article to be produced, thus resulting in a saving of a considerable portion of the sheet metal.

This method of forming the tapered article contemplates the stretching or elongation of one side of the sheet to a length substantially equal to the larger circumference of the article; and the then shaping of the sheet to be tubularly tapered.

There are numerous ways in which this method may be accomplished, a few of which are illustrated and described in the accompanying drawings and specification.

The sheet blank may be elongated, and reduced in thickness, along one edge and then shaped to be tubularly tapered, or the rectangular sheet may be formed into a straight cylinder and then stretched and elongated at one end of the cylinder and then shaped to be tubularly tapered.

This elongation of the metal may be produced by cold rolling or by stamping, hammering or pressing the metal to elongate the same along one edge, or tapered corrugations may be pressed, hammered or rolled into the portion of the metal to be elongated and then pressed, hammered or rolled out, producing a tapered tubular article.

The above and other objects may be attained in the manner illustrated in the accompanying drawings, in which Fig. 1 is a plan view of the sheet from which the body of a pail or the like may be produced in ordinary practice;

Fig. 2, a view of the same with the ends sheared at an angle;

Fig. 3, a perspective view of the tapered tubular body formed from the sheet blank shown in Fig. 2;

Fig. 4, a plan view of a rectangular sheet blank for producing the same tapered tubular body as shown in Fig. 3 by the improved method;

Fig. 5, a plan view of this sheet blank after the same has been corrugated by pressing, hammering, or rolling;

Fig. 6, an edge view of the corrugated edge of the blank shown in Fig. 5;

Figure 14:
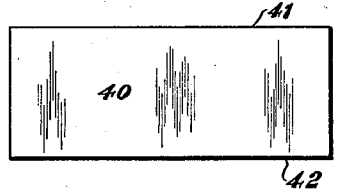
Figure 11:
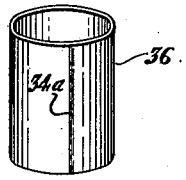
Figure 15:
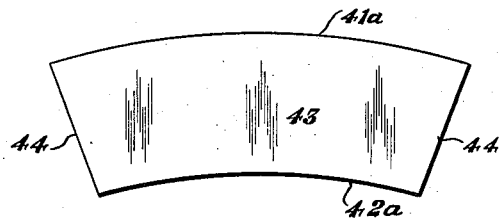
Figure 12:
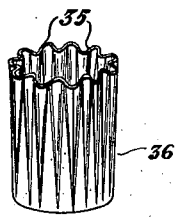
Figure 16:
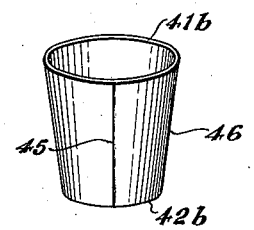
Figure 13:
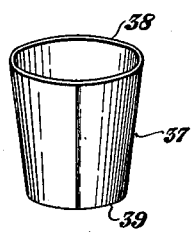

Fig. 7, an end view of the same;

Fig. 8, a plan view of the same sheet blank after the corrugations have been flattened out;

Fig. 9, a perspective view of the tapered tubular body shaped from the blank shown in Fig. 8;

Fig. 10, a plan view of a blank similar to that shown in Fig. 4;

Fig. 11, a perspective view of a straight cylinder formed from the blank shown in Fig. 10;

Fig. 12, a perspective view of the same cylinder after it has been corrugated;

Fig. 13, a perspective view of the tapered tubular article shaped from the corrugated cylinder shown in Fig. 12;

Fig. 14, a plan view of a sheet blank similar to the blank shown in Figs. 4 and 10;

Fig. 15, a plan view of the same blank after one edge portion has been elongated by cold rolling, pressing, hammering, or the like; and Fig. 16, a perspective view of the tapered tubular article shaped from the elongated blank shown in Fig. 15.

Similar numerals refer to similar parts throughout the drawings.

In the ordinary method of making a tapered tubular body for a pail, bucket, tub, can, or the like, a sheet blank such as shown at 20 in Fig. 1 is used. The upper edge 21 of this sheet blank is substantially equal to the larger or top circumference of the pail or the like to be produced.

The end and side portions 22 of the sheet are then sheared angularly and arcuately along the lines 23, producing the sheet blank 20$^a$ shown in Fig. 2, having the top edge 21' substantially the same chord length as the original sheet and the bottom edge 24 substantially equal to the bottom or smaller circumference of the article to be formed.

This sheet blank, as shown in Fig. 2, is then formed into the tapered tubular body 25 as shown in Fig. 3, the angular edges 23 of the blank being connected together in any usual and well-known manner as shown at 23$^a$.

The top or larger circumference 21$^a$ is formed from the top or longer edge 21 of the blank and the bottom or smaller circumference 24$^a$ of the tubular body is formed from the lower or shorter edge 24 of the blank.

It will thus be seen that the end and side portions 22 of each sheet are wasted, resulting in considerable loss of the sheet material in manufacturing tapered tubular articles under the existing practice.

The improved method to which the invention pertains contemplates the saving of about twenty-five per cent of the sheet material by forming the tapered tubular body from a rectangular sheet blank of a length substantially equal to the bottom or smaller circumference of the tapered tubular article to be formed, the sheet metal being elongated and reduced in thickness toward the upper or larger end of the tapered article.

This elongation or stretching of the metal at one end of the article may be accomplished in numerous ways and may be done either before or after the sheet blank is formed into tubular shape.

In Figs. 4 to 9 inclusive is illustrated one way of accomplishing the invention. In this manner of carrying out the improved method of manufacture, a rectangular sheet blank 26, as shown in Fig. 4, and having its upper and lower edges 27 and 28 respectively, each substantially equal to the smaller or bottom circumference of the tapered tubular article to be formed, is corrugated along its upper edge as shown in Fig. 5.

The corrugations 29 are tapered from the upper edge toward the lower as best shown in Figs. 5 and 7.

These corrugations may be placed in the sheet by pressing, hammering, rolling, or any other usual and well-known way.

The corrugated portion of the sheet is then flattened by hammering, pressing, rolling, or the like, and since the metal in the corrugated portion of the sheet has been stretched or elongated by the corrugating, the upper edge of the sheet will be longer than the lower edge when the corrugations are flattened out, producing the sheet blank as shown in Fig. 8 with the upper elongated edge 27$^a$ while the lower edge 28$^a$ retains its original chord length.

This elongated blank shown in Fig. 8 is then shaped into the tapered tubular structure indicated generally at 30 in Fig. 9, the inclined ends 31 of the blank being connected together in any usual and well-known manner as shown at 31$^a$.

The upper or elongated edge 27$^a$ of the blank forms the top or larger end 27$^b$ of the tapered tubular article and the lower or shorter edge 28$^a$ forms the smaller end 28$^b$ thereof.

Although the corrugating and elongation of the metal are above described as being produced in the sheet blank before the same is formed into tubular shape, this corrugating and elongation may be produced after the sheet is formed into tubular shape as illustrated in Figs. 10 to 13 inclusive.

In carrying out the invention in this manner, the rectangular sheet blank 32, illustrated in Fig. 10, is the same as the blank 26 shown in Fig. 4 and this rectangular blank may be formed into a straight cylinder 36 as shown in Fig. 11, the ends 34 of the blank being joined together in usual manner as shown at 34$^a$.

Tapered corrugations 35 may then be placed in the straight cylinder 36, producing the partially formed article shown in Fig. 12, the metal being stretched and elongated at the upper edge of the cylinder, while the lower end of the cylinder remains in its normal condition.

These corrugations are then shaped to produce the tapered tubular article 37 as illustrated in Fig. 13, having the larger upper end 38 produced by the elongation or stretching of the metal and the smaller lower end 39, the circumference of which is substantially equal to the original length of the sheet blank 32.

The elongation or stretching of the metal may be accomplished without corrugating the same, as by cold rolling, hammering or otherwise elongating the metal toward the upper or larger end of the sheet blank or tubular article.

In Fig. 14 is shown a rectangular blank 40 similar to the blanks shown in Figs. 4 and 10. The upper and lower edges 41 and 42 respectively are each substantially equal to the smaller circumference of the tapered tubular article to be formed therefrom.

The upper edge may be reduced in thickness to elongate or stretch the same by cold rolling, hammering, or the like, producing the sheet blank as shown at 43 in Fig. 15, having the elongated upper edge 41$^a$, while the lower edge 42$^a$ has the same chord length as the edge 42 of the original blank.

The tubularly tapered article 46 is then shaped by connecting together the inclined ends 44 of the sheet blank in any well known manner, as indicated at 45, and as shown in Fig. 16, the larger or uper end 41$^b$ being formed from the elongated edge 41$^a$ of the sheet blank while the lower or smaller end 42$^b$ is formed from the shorter edge 42$^a$ of the sheet blank.

It should also be understood that this reduction and elongation of the sheet by cold-rolling or the like may be accomplished by forming a straight cylinder such as shown in Fig. 11 and then elongating one end portion thereof to produce the tapered tubular article.

Although several different ways of carrying out the invention are illustrated and described, it should be understood that the invention consists broadly in making a tapered tubular article from a rectangular sheet blank by stretching or elongating a portion of the sheet metal, regardless of how the stretching or elongation is accomplished, or of whether it is done before or after the sheet blank has been formed into tubular shape.

From the above it will be seen that a very considerable saving in the sheet metal is effected by the improved method, the amount of metal saved being substantially twenty-five per cent of the area of the sheet shown in Fig. 1.

This will be obvious, as the original length of the rectangular sheet blank is only equal to the smaller circumference of the tapered tubular article to be produced, and since the larger circumference is produced by elongation or stretching of the metal, there is absolutely no material wasted.

Although the drawings show the process as carried out by stretching the metal along one entire edge portion of the sheet blank, it should be understood that spaced portions of the sheet may be stretched in order to provide a tubular body having alternately straight and flared sides.

It should also be understood that while, for the purpose of illustration, a tubular body of circular cross-section is shown, any desired polygonal cross-section of tapered tubular body may be produced in the same manner.

I claim:

1. The method of making a conical tubular article from a metal sheet blank, which consists in corrugating the metal blank from one edge to the other in straight tapered corrugations to stretch the one edge portion for increasing the length of the one metal blank edge, the length of the opposed edge remaining unchanged, and then shaping the corrugated metal to be tubularly conical.

2. The method of making a tapered tubular article from a metal sheet blank, which consists in forming a cylindric tube from the metal blank, then stretching the metal at one end portion of the tube to increase the length of the metal edge at the end portion, and then shaping the metal tube to be tubularly tapered.

3. The method of making a tapered tubular article from a metal sheet blank, which consists in forming a cylindric tube from the metal blank, then corrugating one end portion of the tube to stretch the metal for increasing the length of the one end portion metal edge, and then shaping the metal tube to be tubularly tapered.

In testimony that I claim the above, I have hereunto subscribed my name.

MARTIN L. HUNKER.